US012519408B2

(12) United States Patent
Shu et al.

(10) Patent No.: US 12,519,408 B2
(45) Date of Patent: Jan. 6, 2026

(54) VARIABLE COEFFICIENT WIND STORAGE JOINT PRIMARY FREQUENCY REGULATION COORDINATED CONTROL CONSIDERING ROTATIONAL SPEED AND SOC METHOD

(71) Applicant: Kunming University of Science and Technology, Kunming (CN)

(72) Inventors: Hongchun Shu, Kunming (CN); Guangxue Wang, Kunming (CN); Botao Shi, Kunming (CN); Yutao Tang, Kunming (CN); Shunguang Lei, Kunming (CN); Yinan Hu, Kunming (CN); Hongfang Zhao, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 0 days.

(21) Appl. No.: 19/023,434

(22) Filed: Jan. 16, 2025

(65) Prior Publication Data

US 2025/0286486 A1 Sep. 11, 2025

(30) Foreign Application Priority Data

Mar. 5, 2024 (CN) .......................... 202410247128.1

(51) Int. Cl.
*H02P 9/10* (2006.01)
*F03D 9/25* (2016.01)
(Continued)

(52) U.S. Cl.
CPC .............. *H02P 9/105* (2013.01); *F03D 9/257* (2017.02); *H02J 3/28* (2013.01); *H02J 3/38* (2013.01);
(Continued)

(58) Field of Classification Search
CPC ...... H02P 9/105; H02P 2101/15; F03D 9/257; H02J 7/00712; H02J 3/28; H02J 3/38; H02J 2300/28; F05B 2220/706
See application file for complete search history.

(56) References Cited

U.S. PATENT DOCUMENTS

| 2010/0066087 A1* | 3/2010 | Hayashi | .................... H02P 9/00 290/44 |
| 2014/0316592 A1* | 10/2014 | Haj-Maharsi | .......... G05B 15/02 290/44 |

FOREIGN PATENT DOCUMENTS

| CN | 110635492 A | 12/2019 |
| CN | 110768307 A | 2/2020 |

(Continued)

OTHER PUBLICATIONS

Yulu Ma, Optimal control technology of primary frequency regulation in power grid with wind-storage combined operation, 2022, pp. 1-75.

*Primary Examiner* — Sean Gugger
(74) *Attorney, Agent, or Firm* — Bayramoglu Law Offices LLC

(57) ABSTRACT

A method for coordinated control of wind-storage joint primary frequency regulation, considering rotational speed and SOC, within the field of power system frequency regulation, includes: determining if the grid frequency deviation exceeds the primary frequency regulation dead zone; if exceeded, calculating the system's frequency regulation demand power based on the deviation; assessing the available frequency regulation power from wind turbines using their rotational speed; formulating a frequency regulation strategy based on the demand and available power; and executing the strategy. This approach effectively addresses the delay caused by wind speed variations, which hinders wind turbines from promptly adjusting output power (Continued)

to meet primary frequency regulation demands. The method enhances the stability of power system operation.

18 Claims, 9 Drawing Sheets

(51) Int. Cl.
    *H02J 3/28*     (2006.01)
    *H02J 3/38*     (2006.01)
    *H02J 7/00*     (2006.01)
    *H02P 101/15*     (2016.01)

(52) U.S. Cl.
    CPC ..... *H02J 7/00712* (2020.01); *F05B 2220/706* (2013.01); *H02J 2300/28* (2020.01); *H02P 2101/15* (2015.01)

(56) References Cited

FOREIGN PATENT DOCUMENTS

| | | |
|---|---|---|
| CN | 114039386 A | 2/2022 |
| CN | 117353336 A | 1/2024 |

\* cited by examiner

VARIABLE COEFFICIENT WIND STORAGE JOINT PRIMARY FREQUENCY REGULATION COORDINATED CONTROL CONSIDERING ROTATIONAL SPEED AND SOC METHOD

CROSS-REFERENCE TO THE RELATED APPLICATIONS

This application is based upon and claims priority to Chinese Patent Application No. 202410247128.1, filed on Mar. 5, 2024, the entire contents of which are incorporated herein by reference.

TECHNICAL FIELD

This application relates to the technical field of frequency regulation in power systems, and particularly to a variable coefficient wind-storage joint primary frequency regulation coordination control method considering rotational speed and SOC.

BACKGROUND

New energy units are characterized by randomness, volatility, and low inertia. As a result, the grid integration of large-scale new energy units is changing the operational characteristics of traditional power grids. With the increasing proportion of low-inertia and weakly-supported new energy units in the power grid, the system's rotational inertia has significantly decreased, which in turn leads to a gradual decline in the system's ability to support and regulate frequency.

In related technologies, considering the characteristics of wind farms and energy storage systems, methods such as fuzzy control, PID control, or optimal control are generally adopted. These methods, combined with actual wind speeds and unit characteristics, achieve wind farm output power control by adjusting the rotational speed of wind turbines.

However, in the aforementioned schemes, wind speed is the primary factor affecting the output power of wind turbines, but changes in wind speed are unpredictable and exhibit a certain delay. Consequently, this delay causes the adjustment of wind turbine output power to be unable to immediately respond to the grid's primary frequency regulation demand, resulting in temporary instability when the grid frequency experiences instantaneous fluctuations.

SUMMARY

This application embodiment provides a variable coefficient wind-storage joint primary frequency regulation coordination control method, device, and readable storage medium considering rotational speed and SOC, addressing the issue of delay in wind speed variation in related technologies. This delay leads to the inability of wind turbine output power adjustments to immediately respond to the primary frequency regulation demands of the power grid. The embodiment achieves the technical effect of ensuring the stable operation of the power system.

This application embodiment provides a variable coefficient wind-storage joint primary frequency regulation coordination control method considering rotational speed and SOC. The method includes:
determining whether the frequency deviation exceeds the primary frequency regulation deadband based on the acquired grid frequency;
if exceeded, determining the system frequency regulation power demand based on the frequency deviation;
determining the current frequency regulation power based on the acquired wind turbine rotational speed, where the current frequency regulation power is the frequency regulation power that the wind turbine can provide;
determining a frequency regulation strategy based on the system frequency regulation power demand and the current frequency regulation power; and
executing the frequency regulation strategy.

Optionally, the step of determining whether the frequency deviation exceeds the primary frequency regulation deadband based on the acquired grid frequency includes:
obtaining the system's rated frequency and the preset primary frequency regulation deadband;
determining the frequency deviation based on the grid frequency and the system rated frequency;
if the frequency deviation lies within the range corresponding to the primary frequency regulation deadband, it is determined that the frequency deviation has not exceeded the primary frequency regulation deadband;
otherwise, it is determined that the frequency deviation has exceeded the primary frequency regulation deadband.

Optionally, the step of determining the system frequency regulation power demand based on the frequency deviation includes:
determining the first power based on the frequency deviation and the first coefficient;
determining the second power based on the frequency deviation and the second coefficient; and
determining the system frequency regulation power demand based on the difference between the first power and the second power.

Optionally, the step of determining the current frequency regulation power based on the acquired wind turbine rotational speed, where the current frequency regulation power is the frequency regulation power that the wind turbine can provide, includes:
determining the historical rotational speed of the wind turbine;
determining the virtual inertia time constant of the wind turbine; and
determining the current frequency regulation power based on the historical rotational speed, the wind turbine rotational speed, and the virtual inertia time constant.

Optionally, the step of determining the frequency regulation strategy based on the system frequency regulation power demand and the current frequency regulation power includes:
when the current frequency regulation power is greater than or equal to the system frequency regulation power demand, determining the frequency regulation strategy as wind turbine participation in primary frequency regulation;
when the current frequency regulation power is less than the system frequency regulation power demand, determining the frequency regulation strategy as joint frequency regulation by wind and storage.

Optionally, the step of determining the frequency regulation strategy as wind turbine participation in primary frequency regulation when the current frequency regulation power is greater than or equal to the system frequency regulation power demand includes:
when the current frequency regulation power is greater than or equal to the system frequency regulation power demand, establishing a simultaneous equation for the system frequency regulation power demand and the actual frequency regulation power of the wind turbine;

determining the inertia coefficient based on the simultaneous equation and the virtual inertia time constant;

determining a variable coefficient virtual inertia control strategy based on the inertia coefficient.

Optionally, the step of determining the frequency regulation strategy as joint frequency regulation by wind and storage when the current frequency regulation power is less than the system frequency regulation power demand includes:

when the current frequency regulation power is less than the system frequency regulation power demand, determining the droop coefficient of the energy storage device based on the frequency deviation and the collected state of the energy storage device;

determining the frequency regulation strategy as joint frequency regulation by wind and storage based on the current frequency regulation power and the droop coefficient.

Optionally, after the step of determining whether the frequency deviation exceeds the primary frequency regulation deadband based on the obtained grid frequency, the following steps are included:

if the frequency deviation does not exceed the frequency regulation deadband, determining whether to activate the energy storage recovery strategy based on the collected state of the energy storage device;

if activated, determining the charging recovery coefficient and discharging recovery coefficient respectively based on the state of the energy storage device and the preset minimum, median, and maximum values of energy storage;

executing the energy storage recovery strategy based on the charging recovery coefficient and the discharging recovery coefficient.

In addition, this application also proposes a variable-coefficient wind-storage joint primary frequency regulation coordination control device considering rotational speed and SOC. The variable-coefficient wind-storage joint primary frequency regulation coordination control device includes a memory, a processor, and a frequency regulation control program stored in the memory and operable on the processor. When the processor executes the frequency regulation control program, it implements the steps of the variable-coefficient wind-storage joint primary frequency regulation coordination control method considering rotational speed and SOC described above.

In addition, this application also proposes a computer-readable storage medium. The computer-readable storage medium stores a frequency regulation control program, which, when executed by a processor, implements the steps of the variable-coefficient wind-storage joint primary frequency regulation coordination control method considering rotational speed and SOC as described above.

One or more technical solutions provided in this application have at least the following technical effects or advantages:

By adopting the method of determining whether the frequency deviation exceeds the primary frequency regulation deadband based on the obtained grid frequency, if it exceeds, determining the system frequency regulation demand power based on the frequency deviation; determining the current frequency regulation power based on the obtained wind turbine rotational speed, where the current frequency regulation power is the frequency regulation power that the wind turbine can provide; determining a frequency regulation strategy based on the system frequency regulation demand power and the current frequency regulation power; and executing the frequency regulation strategy, this effectively addresses the technical problem in related technologies where changes in wind speed exhibit a certain delay, which in turn leads to the inability of the wind turbine's output power adjustment to immediately respond to the grid's primary frequency regulation demand. This achieves the technical effect of ensuring the stable operation of the power system.

DETAILED DESCRIPTION OF THE EMBODIMENTS

In related technologies, wind speed is the main influencing factor of wind turbine output power. However, changes in wind speed are unpredictable, meaning that wind speed changes have a certain delay. This, in turn, causes the adjustment of wind turbine output power to fail to immediately respond to the primary frequency regulation demand of the power grid, resulting in temporary instability when the grid frequency fluctuates instantaneously. The main technical solution adopted in this application example is as follows: real-time collection of the grid frequency at the wind turbine grid connection point, wind turbine speed, and the state of energy storage equipment, and then determining the system frequency regulation demand power and the current frequency regulation power that the wind turbine can provide based on the frequency deviation. Subsequently, a frequency regulation strategy is determined based on the system frequency regulation demand power and the current frequency regulation power, and the frequency regulation strategy is executed accordingly. This achieves the coordination of wind turbine operating conditions and the state of charge (SOC) of the energy storage system for their participation in primary frequency regulation of the power system, improving the capability of the wind-storage system to participate in primary frequency regulation. At the same time, the consideration of energy storage self-recovery ensures that its SOC remains within an ideal range, thereby enhancing its continuous adjustment margin as a technical effect.

To better understand the above technical solution, the exemplary embodiments of this application will be described in more detail below with reference to the accompanying drawings. Although the exemplary embodiments of this application are shown in the accompanying drawings, it should be understood that this application can be implemented in various forms and should not be limited by the embodiments described herein. On the contrary, these embodiments are provided to enable a more thorough understanding of this application and to fully convey the scope of this application to those skilled in the art.

Figure 1:
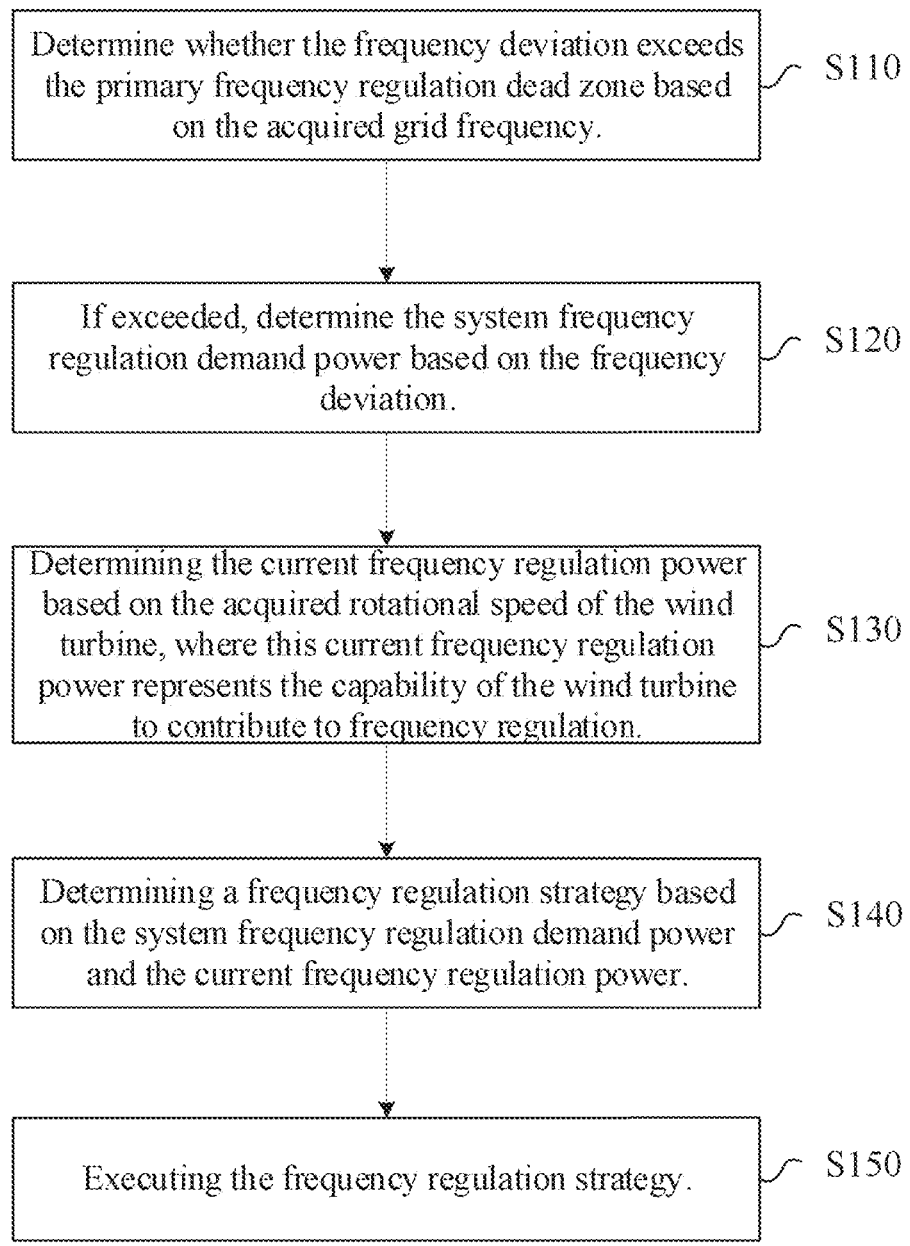
FIG. 1 is a flow diagram of Example 1 of the variable coefficient wind-storage joint primary frequency regulation coordination control method considering rotational speed and SOC in this application.

Example 1: Example 1 of this application discloses a variable coefficient wind-storage joint primary frequency regulation coordination control method considering rotational speed and SOC. Referring to FIG. 1, the variable coefficient wind-storage joint primary frequency regulation coordination control method considering rotational speed and SOC includes:

Step S110: Based on the acquired grid frequency, determine whether the frequency deviation exceeds the primary frequency regulation dead zone.

As an optional embodiment, obtain the preset system rated frequency, determine the frequency deviation based on the difference between the grid frequency and the system rated frequency, obtain the preset primary frequency regulation dead zone, and determine whether the value corresponding to the frequency deviation falls within the interval corresponding to the primary frequency regulation dead zone. If it is within, then it is determined that the frequency deviation has not exceeded the primary frequency regulation dead zone; if it is not within the interval, then it is determined that the frequency deviation has exceeded the primary frequency regulation dead zone.

Optionally, during the normal operation of the power grid, the grid connection point frequency of the wind farm, i.e., the grid frequency f, the real-time wind speed v of the wind farm, the rotational speed ω of the wind turbine, and the SOC state of the energy storage device are sampled and monitored in real time, where the SOC state of the energy storage device refers to the state of the energy storage device.

Optionally, step S110 includes:
obtaining the system rated frequency and the preset primary frequency regulation dead zone, as well as obtaining the system rated power and the preset primary frequency regulation dead zone. Determining the frequency deviation based on the grid frequency and the system rated frequency; when the frequency deviation is within the range corresponding to the primary frequency regulation dead zone, determining that the frequency deviation has not exceeded the primary frequency regulation dead zone; otherwise, determining that the frequency deviation has exceeded the primary frequency regulation dead zone.

As an optional embodiment, obtaining the system's rated frequency and power: Obtain the system's rated frequency and power values from the grid monitoring system or other reliable data sources. The rated frequency is typically the standard frequency during grid operation, such as 50 Hz or 60 Hz. The rated power is the maximum power the system can provide. Obtaining the set value of the primary frequency regulation dead zone: The primary frequency regulation dead zone is a pre-set range of frequency deviations used to determine whether the frequency deviation is significant. This value is typically specified in the system dispatch or frequency regulation control strategy. Obtaining the grid frequency and calculating the frequency deviation: Obtain real-time grid frequency data and compare it with the system's rated frequency to calculate the frequency deviation. The formula for calculating the frequency deviation is: Frequency deviation=Current grid frequency−System rated frequency. Determining whether the frequency deviation exceeds the primary frequency regulation dead zone: Compare the calculated frequency deviation with the primary frequency regulation dead zone. If the frequency deviation is within the range corresponding to the primary frequency regulation dead zone, it is determined that the frequency deviation has not exceeded the primary frequency regulation dead zone. Otherwise, it is determined that the frequency deviation has exceeded the primary frequency regulation dead zone. Obtain the system's rated frequency and power, and calculate the frequency deviation. Based on the set value of the primary frequency regulation dead zone, determine whether the frequency deviation exceeds the primary frequency regulation dead zone to decide whether frequency regulation control is needed.

Exemplarily, if the frequency deviation exceeds the primary frequency regulation dead zone range [−0.033 Hz, 0.033 Hz], i.e., $|\Delta f|=|f-f_N|>0.33$, then the wind turbine and energy storage device participate in primary frequency regulation. At this point, $\Delta f$ represents the frequency deviation, f is the actual measured frequency, and $f_N$ is the system rated frequency of 50 Hz; the primary frequency regulation dead zone is [−0.033 Hz, 0.033 Hz].

Step S120: If exceeded, determine the system's frequency regulation required power based on the frequency deviation.

In this embodiment, the system's frequency regulation required power is the current power imbalance of the power system.

As an optional implementation, the corresponding power value is determined based on the frequency deviation and the corresponding coefficient, and then the system frequency regulation required power is determined.

Step S130: Determine the current frequency regulation power based on the obtained wind turbine speed, where the current frequency regulation power is the frequency regulation power that the wind turbine can provide.

In this embodiment, the current frequency regulation power is determined based on the real-time collected wind turbine speed and the operating speed range of the wind turbine. The current frequency regulation power is the frequency regulation power that the wind turbine can provide in its current state.

In this embodiment, the doubly-fed wind turbine, that is, the relationship between the wind turbine speed and the wind turbine operation under actual wind speed:

$$\begin{cases} P_m = \frac{1}{2}\rho S v^3 C_p(\lambda, \beta) \\ C_P = 0.22\left(\frac{116}{\lambda_i} - 0.4\beta - 5\right)e^{\frac{12.5}{\lambda_i}} \\ \frac{1}{\lambda_i} = \frac{1}{\lambda + 0.08\beta} - \frac{0.035}{\beta^3 + 1} \\ \lambda = \frac{39\omega_W}{v} \end{cases}$$

In the formula, $C_p(\lambda, \beta)$ is the wind energy utilization coefficient, $\beta$ is the pitch angle, and $\lambda$ is the tip speed ratio; v is the wind speed; S is the rotor swept area of the wind turbine; and $\rho$ is the air density. The wind energy utilization coefficient $C_p$ is also related to the pitch angle $\beta$ and the tip speed ratio $\lambda$ of the wind turbine.

Step S140: Determine the frequency regulation strategy based on the system frequency regulation power demand and the current frequency regulation power.

In this embodiment, the frequency regulation strategy includes wind turbines participating in primary frequency regulation, with energy storage devices compensating for the frequency drop of wind turbines. It also includes joint participation of wind turbines and energy storage devices in system frequency adjustment.

As an optional embodiment, the corresponding frequency regulation strategy is determined based on the numerical relationship between the system frequency regulation power demand and the current frequency regulation power.

Step S150: Execute the frequency regulation strategy.

In this embodiment, after determining the corresponding frequency regulation strategy, the corresponding frequency regulation strategy is executed.

Figure 4:
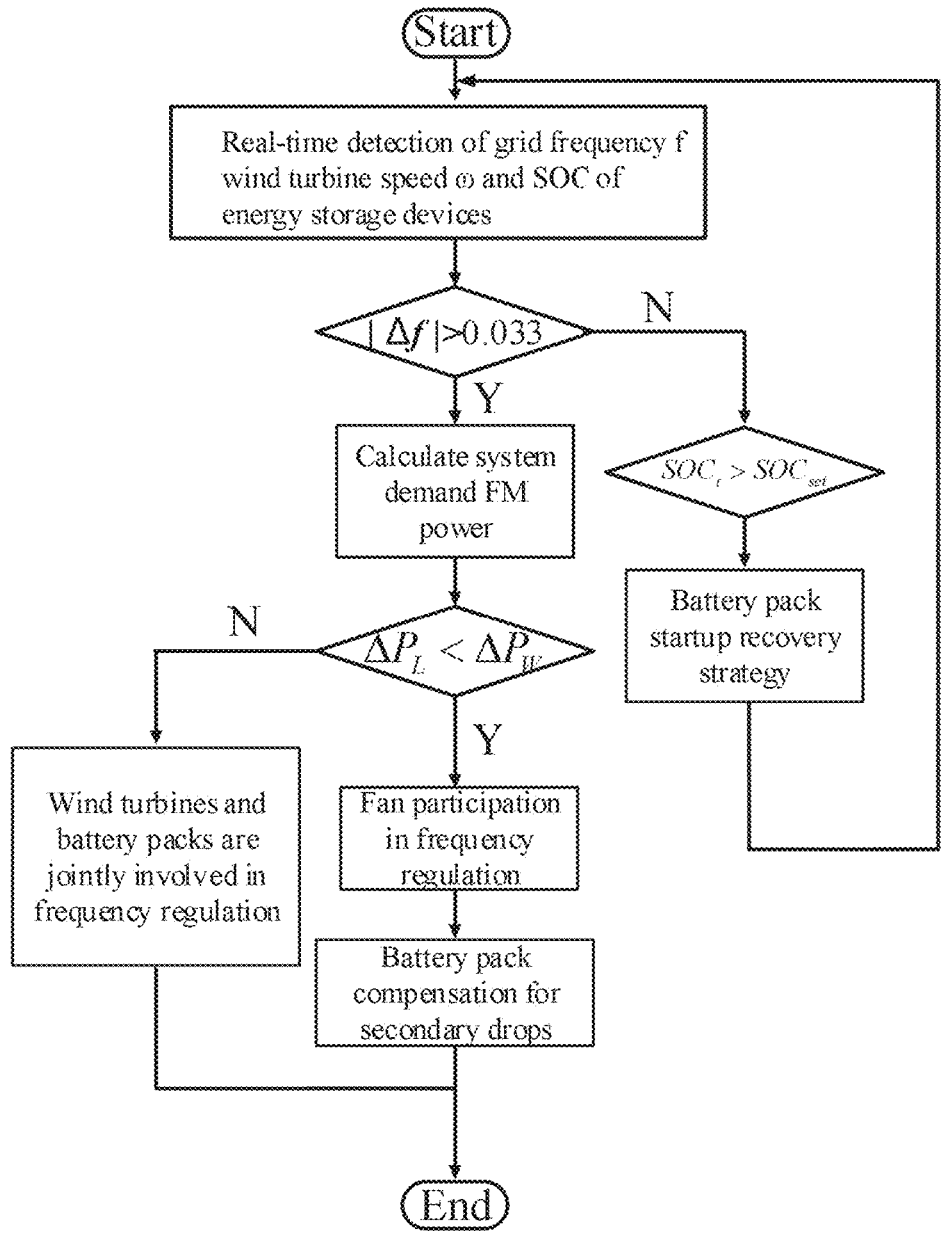
FIG. 4 is a flow chart of the wind-storage joint system primary frequency regulation control strategy in Example 1 of the variable coefficient wind-storage joint primary frequency regulation coordination control method considering rotational speed and SOC in this application.

As an optional embodiment, referring to FIG. 4, during the normal operation of the wind-storage system, the grid frequency f, the rotational speed ω of the wind turbine, and the state of the energy storage device are monitored in real-time. Then, it is determined whether the frequency deviation Δf exceeds the primary frequency regulation dead zone. If the system frequency deviation Δf exceeds the primary frequency regulation dead zone, the required power for system frequency regulation, i.e., system frequency regulation demand power, is calculated based on the system frequency deviation. The frequency regulation power that the wind turbine can provide, i.e., the current frequency regulation power, is calculated based on the rotational speed of the wind turbine and its operating range. The size relationship between the system frequency regulation demand power and the current frequency regulation power is then determined. If the system frequency regulation demand power is less than the current frequency regulation power, the wind turbine participates in frequency regulation, and the energy storage compensates for the secondary frequency drop of the wind turbine. If the system frequency regulation demand power is greater than the current frequency regulation power, the wind-storage system jointly participates in system frequency adjustment. The battery pack in FIG. 4 is a specific embodiment of the energy storage device.

By using the method of determining whether the frequency deviation exceeds the primary frequency regulation dead zone based on the obtained grid frequency, and if it exceeds, determining the system frequency regulation demand power based on the frequency deviation, as well as determining the current frequency regulation power based on the obtained rotational speed of the wind turbine (where the current frequency regulation power is the frequency regulation power that the wind turbine can provide), the frequency regulation strategy is determined based on the system frequency regulation demand power and the current frequency regulation power. By executing the frequency regulation strategy, this effectively resolves the technical issue in related technologies where the variability of wind speed has a certain delay, which in turn causes the wind turbine's output power adjustment to not immediately respond to the primary frequency regulation demand of the grid. This achieves the technical effect of ensuring the stable operation of the power system.

Based on Embodiment 1, Embodiment 2 of this application proposes a variable-coefficient wind-storage joint primary frequency regulation coordinated control method considering rotational speed and SOC. Step S120 includes:

Step S210: Determine the first power based on the frequency deviation and the first coefficient.

In this embodiment, the first coefficient is the generator frequency regulation coefficient, and the first power is the active power generated by traditional units in response to frequency changes.

Determine the first power based on the product of the frequency deviation and the first coefficient.

Step S220: Determine the second power based on the frequency deviation and the second coefficient.

In this embodiment, the second coefficient is the load frequency regulation coefficient, and the second power is the active power reduced by the load in response to frequency changes.

Determine the second power based on the product of the frequency deviation and the second coefficient.

Step S230: Determine the system frequency regulation demand power based on the difference between the first power and the second power.

In this embodiment, determine the system frequency regulation demand power based on the difference between the first power and the second power.

As an optional implementation, calculate the system frequency regulation power based on the system frequency deviation and determine the relationship between the frequency regulation power required by the system and the frequency regulation power of the wind turbine. The calculation method is as follows:

$$\begin{cases} \Delta P_G = -K_G \Delta f \\ \Delta P_L = K_L \Delta f \end{cases}$$

$$\Delta P_G - \Delta P_L = \Delta P_a$$

$\Delta P_G$ represents the active power generated by traditional units in response to frequency changes, $\Delta P_L$ represents the active power reduced by the load in response to frequency changes, $K_G$ is the generator frequency regulation coefficient, $K_L$ is the load frequency regulation coefficient, and $\Delta P_a$ represents the system imbalance power, which is the system frequency regulation demand power.

By determining the first power based on the frequency deviation and the first coefficient, determining the second power based on the frequency deviation and the second coefficient, and determining the system frequency regulation demand power based on the difference between the first power and the second power, this method achieves accurate calculation of the current system frequency regulation demand power. This, in turn, determines the quantified state of system imbalance and provides accuracy for the primary frequency regulation of wind turbines.

Based on Embodiment 1, Embodiment 3 of this application proposes a variable-coefficient wind-storage joint primary frequency regulation coordinated control method considering rotational speed and SOC. Step S130 includes:

Step S310: Determine the historical rotational speed of the wind turbine unit.

In this embodiment, the historical rotational speed refers to the rotational speed of the wind turbine corresponding to the last frequency regulation action, taking the current moment as the reference point.

As an optional implementation, since the frequency regulation action of a wind turbine is a dynamic process, the rotational speed of the wind turbine at the previous moment is obtained as the historical rotational speed.

Step S320: Determine the virtual inertia time constant of the wind turbine unit.

In this embodiment, the preset virtual inertia time constant of the wind turbine unit is determined.

Step S330: Determine the current frequency regulation power based on the historical rotational speed, the rotational speed of the wind turbine unit, and the virtual inertia time constant.

In this embodiment, the speed difference is determined based on the historical rotational speed and the rotational speed of the wind turbine. A first equation is determined based on the historical rotational speed, the wind turbine rotational speed, and the speed difference. The current frequency regulation power is determined based on the virtual inertia time constant, the differential of the historical rotational speed, and the differential of the wind turbine rotational speed.

As an example, the per-unit value of active power for wind turbines participating in primary frequency regulation is:

$$\begin{cases} \Delta P = 2H_W\left(\omega_1 \dfrac{d\omega_1}{dt} - \omega_2 \dfrac{d\omega_2}{dt}\right) \\ \omega_1 = \omega_2 + \Delta\omega \end{cases}$$

In the formula, $H_W$ represents the virtual inertia time constant of the wind turbine; $\omega_1$ represents the rotational speed of the doubly-fed wind turbine at time $t_1$ without participating in system frequency regulation, i.e., the historical rotational speed; $\omega_2$ represents the rotational speed of the doubly-fed wind turbine at time $t_2$ after participating in system frequency regulation, i.e., the wind turbine rotational speed; $\Delta\omega$ represents the rotational speed difference before and after frequency regulation of the wind turbine; $\Delta P$ represents the active power of the doubly-fed wind turbine that can participate in primary frequency regulation, i.e., the current frequency regulation power. It is necessary to ensure that the adjusted rotational speed of the wind turbine remains within the normal operating range of 0.7~1.2 pu.

In this embodiment, the wind turbine rotational speed $\omega$ is a real-time measured value, with its per-unit value represented as $\omega^*$, and the speed range is between 0.7 and 1.2 pu, meaning the maximum speed $\omega^*_{max}$ and minimum speed $\omega^*_{min}$ are 1.2 pu and 0.7 pu, respectively.

By determining the historical rotational speed of the wind turbine, determining the virtual inertia time constant of the wind turbine, and using the historical rotational speed, the wind turbine rotational speed, and the virtual inertia time constant to determine the current frequency regulation power, it achieves accurate determination of the adjustable power of the wind turbine at each moment during real-time frequency regulation, thereby improving the accuracy of frequency regulation.

Based on Embodiment 1, Embodiment 4 of this application proposes a variable coefficient wind-storage coordinated primary frequency regulation control method considering rotational speed and SOC. Step S140 includes:

Step S410: When the current frequency regulation power is greater than or equal to the required system frequency regulation power, determining the frequency regulation strategy as wind turbine participation in primary frequency regulation;

Step S420: When the current frequency regulation power is less than the required system frequency regulation power, determining the frequency regulation strategy as joint wind-storage frequency regulation.

In this embodiment, the relationship between the required system frequency regulation power and the current frequency regulation power is determined. When the current frequency regulation power is greater than or equal to the required system frequency regulation power, the frequency regulation strategy is determined as wind turbine participation in primary frequency regulation, meaning the wind turbine participates in frequency regulation and the energy storage compensates for the secondary frequency drop of the wind turbine. When the current frequency regulation power is less than the required system frequency regulation power, meaning the wind turbine alone is insufficient to execute the frequency regulation action, the frequency regulation strategy is determined as joint wind-storage frequency regulation, where the wind turbine and energy storage devices jointly participate in system frequency adjustment.

Figure 2:
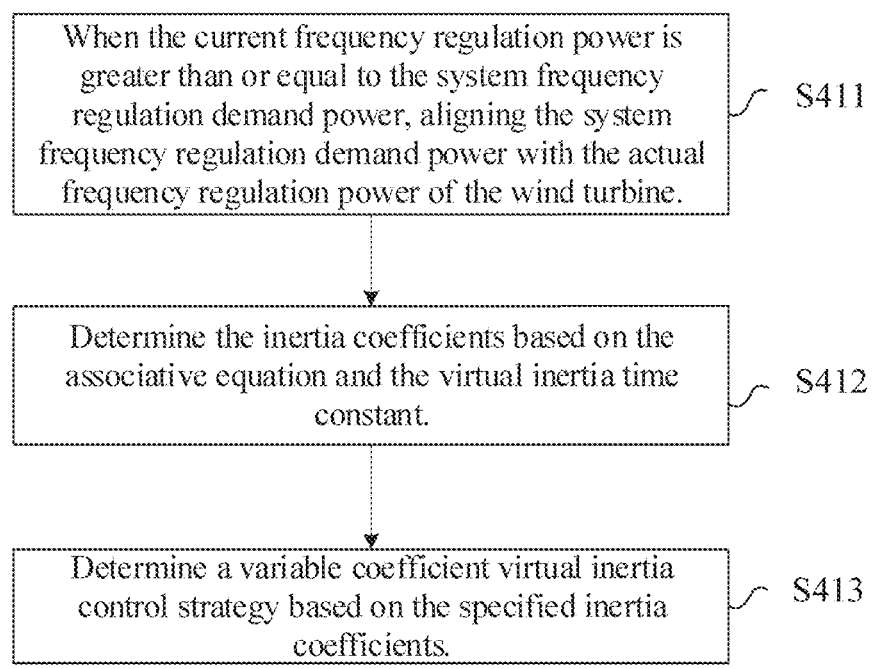
FIG. 2 is a flow diagram of steps S411-S413 in Example 4 of the variable coefficient wind-storage joint primary frequency regulation coordination control method considering rotational speed and SOC in this application.

Optionally, referring to FIG. 2, step S410 includes:

Step S411: When the current frequency regulation power is greater than or equal to the required system frequency regulation power, simultaneously solving the required system frequency regulation power and the actual wind turbine frequency regulation power.

In this embodiment, when the current frequency regulation power is greater than or equal to the required system frequency regulation power, a first expression corresponding to the required system frequency regulation power and a second expression corresponding to the actual wind turbine frequency regulation power are determined.

As an optional implementation, the actual active power of the wind turbine participating in primary frequency regulation is determined as:

$$\Delta P = \dfrac{H_W S_W \omega}{25} \dfrac{d\Delta f}{dt}$$

Where $S_W$ represents the wind turbine capacity.

Step S412: Determine the inertia coefficient based on the simultaneous equations and the virtual inertia time constant.

In this embodiment, based on the simultaneous equations, an inertia coefficient is introduced. The inertia coefficient is the coefficient used by the virtual inertia control method when the wind turbine is connected to the grid using virtual inertia control.

As an optional implementation, the reference inertia coefficient $K_{df}$ can be expressed as:

$$\begin{cases} K_{df} = \dfrac{HS_W}{25\omega_N} \dfrac{v}{a} \\ Cp_N = (0.654a - 1.9932)e - 12.5\left(\dfrac{a}{39} - 0.035\right) \\ a = \dfrac{v}{\omega} \end{cases}$$

In the formula, $S_W$ represents the wind turbine capacity, v represents the wind speed, and $C_{pN}$ represents the rated wind energy coefficient. H is the inertia parameter $H_W$. That is, the inertia parameter a is determined based on the wind speed and the wind turbine speed. Based on the inertia parameter, wind speed, rated wind turbine speed, wind turbine capacity, and virtual inertia time constant, the reference inertia coefficient is determined.

As an example, $C_{pN}$=0.593, $\omega_N$=1500, where $\omega_N$ is the rated speed of the wind turbine.

Further, the inertia coefficient is determined based on the reference inertia coefficient. In order to enable the wind turbine to provide as much active power as possible within the speed range to participate in the system's primary frequency regulation, the wind turbine adopts a variable-coefficient virtual inertia control method. The inertia coefficient in the variable-coefficient virtual inertia control is:

$$K_{dW} = \begin{cases} 0 & \omega^* < \omega^*_{min} 或 \omega^* > \omega^*_{max} \\ K_1 K_{df} & \omega^*_{min} \le \omega^* \le \omega^*_{max} \end{cases}$$

In the formula, when $\Delta f<0$, $K_1=1$; when $\Delta f>0$, $K_1=-1$;

After determining the inertia coefficient, substitute it into the simultaneous equations, as follows:

$$\Delta P_G + \Delta P_W - \Delta P_L = (2H_S + K_{dW})\dfrac{d\Delta f}{dt} + D_s \Delta f$$

Step S413: Determine the variable-coefficient virtual inertia control strategy based on the inertia coefficient.

In this embodiment, the variable-coefficient virtual inertia control strategy is determined based on the determined inertia coefficient to control the wind turbine's output power for primary frequency regulation. Compared with the wind turbine's ability to participate in primary frequency regulation, this strategy maximizes the utilization of the wind turbine's inherent frequency regulation capability for primary frequency regulation, effectively reducing the frequency regulation frequency of energy storage devices and avoiding the waste of frequency regulation resources.

Figure 3:
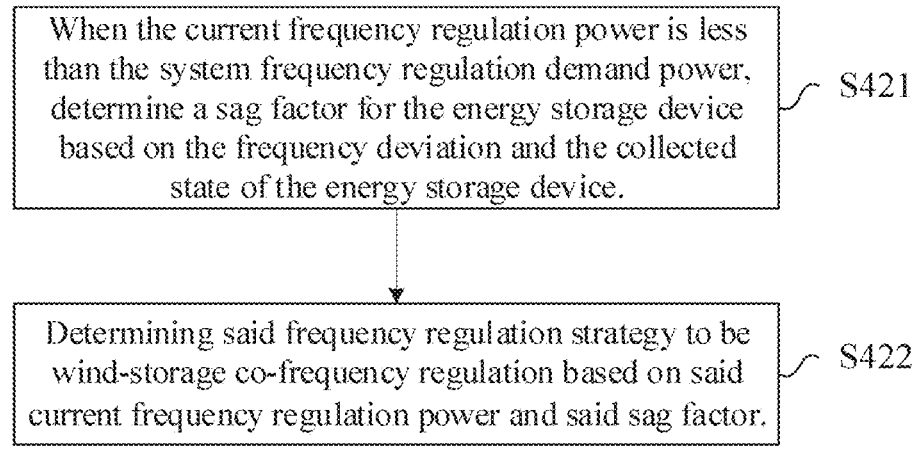
FIG. 3 is a flow diagram of steps S421-S422 in Example 4 of the variable coefficient wind-storage joint primary frequency regulation coordination control method considering rotational speed and SOC in this application.

Optionally, referring to FIG. 3, Step S420 includes:

Step S421: When the current frequency regulation power is less than the system frequency regulation demand power, determine the droop coefficient of the energy storage device based on the frequency deviation and the collected state of the energy storage device.

In this embodiment, when the current frequency regulation power is less than the system frequency regulation demand power, both the wind turbine and the energy storage device need to jointly perform primary frequency regulation. When the wind turbine performs primary frequency regulation, a variable-coefficient virtual inertia control strategy is used, specifically:

$$K_{dW} = \begin{cases} 0 & \omega^* < \omega^*_{min} 或 \omega^* > \omega^*_{max} \\ K_1 K_{df} & \omega^*_{min} \le \omega^* \le \omega^*_{max} \end{cases}$$

When energy storage participates in primary frequency regulation, the SOC-based variable-coefficient droop control strategy of the energy storage is employed, and the droop coefficient of the energy storage device serves as the control coefficient of this strategy.

For example, based on the relationship between the frequency deviation and zero, it is determined whether the system requires battery discharging or charging. The SOC-based variable-coefficient droop control strategy for energy storage participation in primary frequency regulation is as follows:

When $\Delta f<0$, meaning the system requires battery discharging, the formula for its droop coefficient is:

$$K_{BESS} = \begin{cases} 0, & 0 \le SOC_t \le 0.2 \\ 0.15, & 0.2 < SOC_t \le 0.3 \\ 0.3, & 0.3 < SOC_t \le 0.4 \\ 0.45, & 0.4 < SOC_t \le 0.5 \\ 0.6, & 0.5 < SOC_t \le 0.6 \\ 0.75, & 0.6 < SOC_t \le 0.7 \\ 0.9, & 0.7 < SOC_t \le 0.8 \\ 1, & 0.8 < SOC_t \le 1 \end{cases}$$

When $\Delta f>0$, meaning the system requires battery charging, the formula for its droop coefficient is:

$$K_{BESS} = \begin{cases} 1, & 0 \le SOC_t \le 0.2 \\ 0.9, & 0.2 < SOC_t \le 0.3 \\ 0.75, & 0.3 < SOC_t \le 0.4 \\ 0.6, & 0.4 < SOC_t \le 0.5 \\ 0.45, & 0.5 < SOC_t \le 0.6 \\ 0.3, & 0.6 < SOC_t \le 0.7 \\ 0.15, & 0.7 < SOC_t \le 0.8 \\ 0, & 0.8 < SOC_t \le 1 \end{cases}$$

In the formula, $SOC_t$ is the SOC value of the energy storage device at the current moment, and $K_{BESS}$ is the droop control coefficient for the energy storage device participating in primary frequency regulation, i.e., the droop coefficient.

Step S422: Based on the current frequency regulation power and the droop coefficient, determine the frequency regulation strategy as wind-storage joint frequency regulation.

In this embodiment, based on the current frequency regulation power and the determined inertia coefficient, the primary frequency regulation strategy for the wind turbine is determined, and based on the determined droop coefficient, the primary frequency regulation strategy for the energy storage device is determined.

Figure 6:
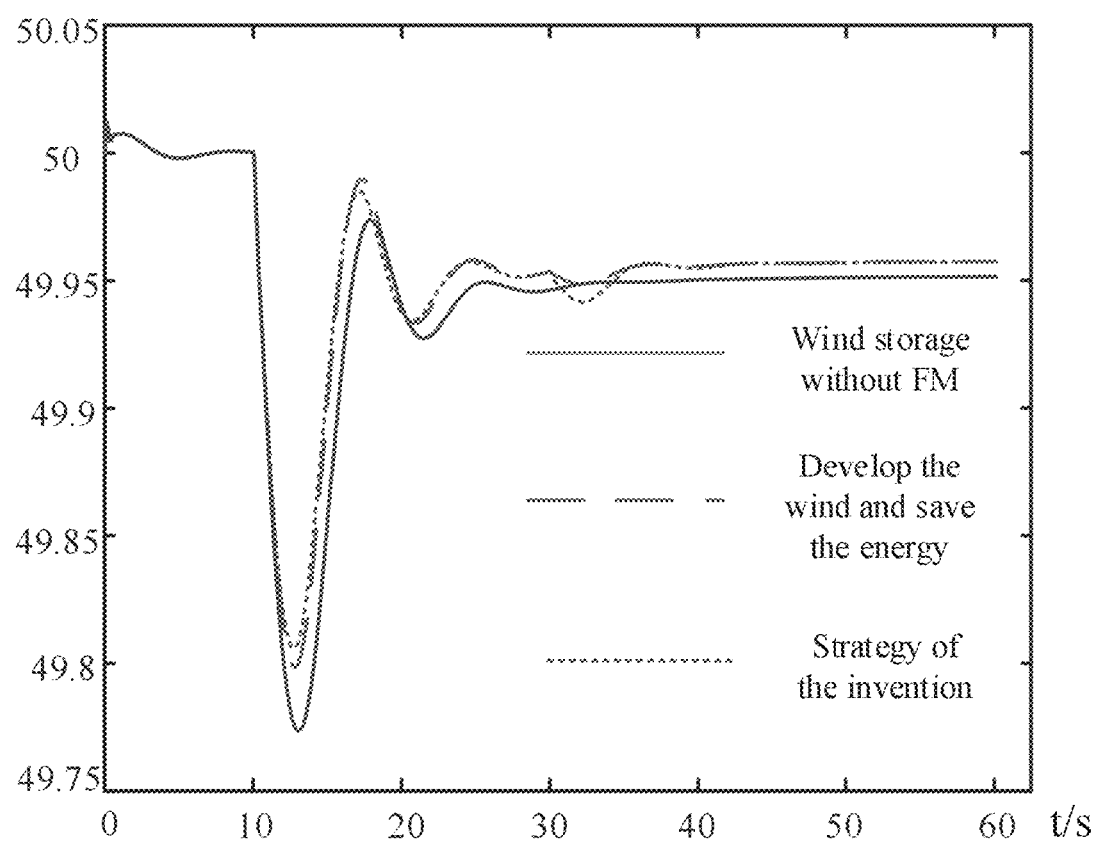
FIG. 6 is an effect diagram of the variable coefficient wind-storage joint primary frequency regulation in Example 4 of the variable coefficient wind-storage joint primary frequency regulation coordination control method considering rotational speed and SOC in this application.

As an example of this embodiment, referring to FIG. 6, FIG. 6 presents a comparison of the frequency regulation effects under three scenarios: variable-coefficient wind-storage joint primary frequency regulation, no frequency regulation by wind-storage, and wind-storage operating at rated power. A three-machine nine-node simulation model was built to analyze the proposed coordinated control method for wind-storage joint primary frequency regulation. The system units include one 100 MW thermal power unit, one 100 MW hydropower unit, 35 doubly-fed wind turbines with a single capacity of 1.5 MW each, and an energy storage battery with a capacity of 0.25 MWh. The initial SOC of the battery pack is 0.7. The system loads Load1, Load2, and Load3 are 117 MW, 95 MW, and 37.5 MW, respectively, while Load4 is a 20 MW adjustable load.

Step 1: When the wind-storage system is operating normally, real-time monitoring of the grid frequency f, wind turbine speed, and energy storage device SOC state is performed.

Step 2: At 10 seconds, the system load suddenly increases by 25 MW. It is determined that the frequency deviation Δf exceeds the primary frequency regulation dead zone, and Step 3 is entered.

Step 3: Based on the system frequency deviation, calculate the system frequency regulation power and the power currently available for frequency regulation from the wind turbine.

Step 4: Compare the system-required frequency regulation power with the wind turbine frequency regulation power. If the system-required frequency regulation power is less than the wind turbine frequency regulation power, the wind turbine participates in frequency regulation, and the energy storage compensates for the secondary frequency drop of the wind turbine. If the system-required frequency regulation power is greater than the wind turbine frequency regulation power, the wind-storage system jointly participates in system frequency adjustment.

Among them, the relationship between the doubly-fed wind turbine operating at the actual wind speed and the turbine speed is as follows.

$$\begin{cases} P_m = \frac{1}{2}\rho S v^3 C_p(\lambda, \beta) \\ C_p = 0.22\left(\frac{116}{\lambda_j} - 0.4\beta - 5\right)e^{\frac{12.5}{\lambda_i}} \\ \frac{1}{\lambda_i} = \frac{1}{\lambda + 0.08\beta} - \frac{0.035}{\beta^3 + 1} \\ \lambda = \frac{39\omega_W}{v} \end{cases}$$

In the formula, $C_p(\lambda, \beta)$ is the wind energy utilization coefficient, β is the pitch angle, and λ is the tip speed ratio; v is the wind speed; S is the rotor swept area of the wind turbine; and ρ is the air density. The wind energy utilization coefficient $C_p$ is also related to the pitch angle β and the tip speed ratio λ of the wind turbine.

As an optional implementation, calculate the system frequency regulation power based on the system frequency deviation and determine the relationship between the frequency regulation power required by the system and the frequency regulation power of the wind turbine. The calculation method is as follows:

$$\begin{cases} \Delta P_G = -K_G \Delta f \\ \Delta P_L = K_L \Delta f \end{cases}$$

$$\Delta P_G - \Delta P_L = \Delta P_a$$

$\Delta P_G$ represents the active power generated by traditional units in response to frequency changes, $\Delta P_L$ represents the active power reduced by the load in response to frequency changes, $K_G$ is the generator frequency regulation coefficient, $K_L$ is the load frequency regulation coefficient, and $\Delta P_a$ represents the system imbalance power, which is the system frequency regulation demand power.

$$\begin{cases} \Delta P = 2H\left(\omega_1 \frac{d\omega_1}{dt} - \omega_2 \frac{d\omega_2}{dt}\right) \\ \omega_1 = \omega_2 + \Delta\omega \end{cases}$$

In the formula, ΔP represents the active power that the doubly-fed wind turbine can participate in for primary frequency regulation, $\omega_1$ is the wind turbine speed at time $t_1$ when not participating in system frequency regulation, $\omega_2$ is the wind turbine speed at time $t_2$ when participating in system frequency regulation, and $\Delta P_\omega$ is the speed difference of the wind turbine before and after frequency regulation. It is required to ensure that the per-unit value of the adjusted wind turbine speed remains within the normal operating range of 0.7 to 1.2 pu.

The criteria for wind-storage participation in primary frequency regulation are as follows:

If $\Delta P \geq \Delta P_a$, the wind turbine participates in primary frequency regulation, and the energy storage compensates for the secondary frequency drop of the wind turbine.

$$\Delta P_G + \Delta P_W - \Delta P_L = (2H_S + K_{dW})\frac{d\Delta f}{dt} + D_s \Delta f$$

ΔP<ΔPa, then the wind storage jointly participate in the system frequency adjustment $$\Delta P_G + \Delta P_W + \Delta P_B - \Delta P_L = (2H_S + K_{dW})\frac{d\Delta f}{dt} + (D_s + K_{dB})\Delta f$$

The doubly-fed wind turbine participates in primary frequency regulation, and the turbine employs a variable coefficient virtual inertia control strategy.

$$K_{dW} = \begin{cases} 0 & \omega^* < \omega^*_{min} \text{或} \omega^* > \omega^*_{max} \\ K_1 K_{df} & \omega^*_{min} \leq \omega^* \leq \omega^*_{max} \end{cases}$$

In the formula, ω* represents the per-unit value of the wind turbine speed, $\omega^*_{min}$ represents the minimum rotor speed of the doubly-fed wind turbine, and $\omega^*_{max}$ represents the maximum rotor speed of the doubly-fed wind turbine. The maximum and minimum speed values in this paper, denoted as $\omega^*_{max}$ and $\omega^*_{min}$, are 1.2 pu and 0.7 pu, respectively. When Δf<0, K=1; when Δf>0, K=−1.

$$\begin{cases} K_{df} = \frac{HS_W}{25\omega_N} \frac{v}{a} \\ Cp_N = (0.654a - 1.9932)e - 12.5\left(\frac{a}{39} - 0.035\right) \\ a = \frac{v}{\omega} \end{cases}$$

In the formula, $S_W$ represents the wind turbine capacity, v represents the wind speed, $C_{pN}$ represents the rated value of the wind energy coefficient, and $\omega_N$ represents the rated speed of the wind turbine.

Energy storage participates in primary frequency regulation, and the droop control strategy for the SOC variable coefficient of energy storage is as follows:

When Δf<0, meaning the system requires the battery pack to discharge, the formula for its droop coefficient is:

$$K_{BESS} = \begin{cases} 0, & 0 \le SOC_t \le 0.2 \\ 0.15, & 0.2 < SOC_t \le 0.3 \\ 0.3, & 0.3 < SOC_t \le 0.4 \\ 0.45, & 0.4 < SOC_t \le 0.5 \\ 0.6, & 0.5 < SOC_t \le 0.6 \\ 0.75, & 0.6 < SOC_t \le 0.7 \\ 0.9, & 0.7 < SOC_t \le 0.8 \\ 1, & 0.8 < SOC_t \le 1 \end{cases}$$

When Δf>0, meaning the system requires battery charging, the formula for its droop coefficient is:

$$K_{BESS} = \begin{cases} 1, & 0 \le SOC_t \le 0.2 \\ 0.9, & 0.2 < SOC_t \le 0.3 \\ 0.75, & 0.3 < SOC_t \le 0.4 \\ 0.6, & 0.4 < SOC_t \le 0.5 \\ 0.45, & 0.5 < SOC_t \le 0.6 \\ 0.3, & 0.6 < SOC_t \le 0.7 \\ 0.15, & 0.7 < SOC_t \le 0.8 \\ 0, & 0.8 < SOC_t \le 1 \end{cases}$$

In the formula, $SOC_t$ represents the current SOC value of the battery pack, and $K_{BESS}$ is the droop control coefficient for energy storage participating in primary frequency regulation.

As another example of this embodiment, a three-machine nine-node simulation model was built to analyze the proposed wind-storage coordinated primary frequency regulation control method. The system units include a 100 MW thermal power unit, a 100 MW hydropower unit, 35 doubly-fed wind turbines each with a single-unit capacity of 1.5 MW, and an energy storage battery with a capacity of 0.25 MWh. The initial SOC of the battery pack is 0.3. Load1, Load2, and Load3, represent the system loads, which are 117 MW, 95 MW, and 37.5 MW, respectively. The system is subjected to continuous load disturbances, with a fluctuation range of (−0.03 pu to 0.04 pu).

The specific implementation steps are as follows:

Step 1: During the normal operation of the wind-storage system, real-time monitoring of the grid frequency f, wind turbine speed, and SOC state of the energy storage device is carried out.

Figure 7:
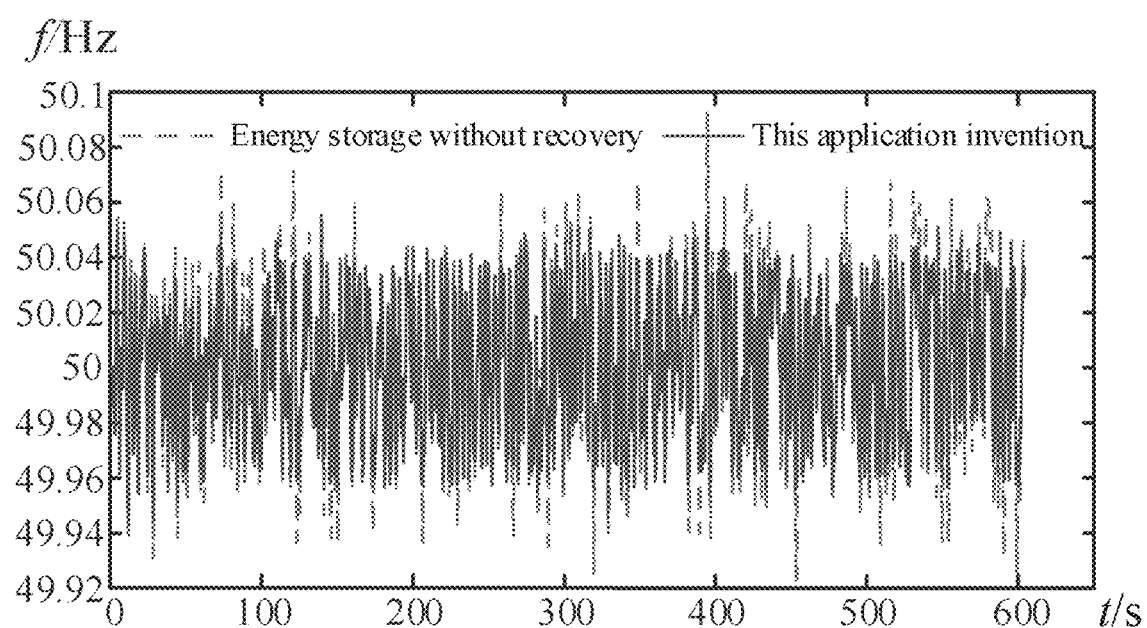
FIG. 7 is an effect diagram of wind-storage primary frequency regulation under continuous load disturbance in Example 4 of the variable coefficient wind-storage joint primary frequency regulation coordination control method considering rotational speed and SOC in this application.

Step 2: Referring to FIG. 7, continuous load disturbances are applied to the system, and it is determined whether the frequency deviation Δf exceeds the primary frequency regulation deadband [−0.033 Hz, 0.033 Hz]. If it exceeds the deadband, proceed to Step 3; otherwise, proceed to Step 5.

Step 3: Calculate the system frequency regulation power and the power that the current wind turbine can provide for frequency regulation based on the system frequency deviation.

Step 4: Determine the relationship between the system's required frequency regulation power and the wind turbine's frequency regulation power; if the system's required frequency regulation power is less than the wind turbine's frequency regulation power, then the wind turbine participates in frequency regulation, and the energy storage compensates for the secondary frequency drop of the wind turbine. If the system's required frequency regulation power is greater than the wind turbine's frequency regulation power, then the wind turbine and energy storage jointly participate in system frequency regulation.

Step 5: Determine whether the system frequency deviation Δf is positive. If the system frequency deviation is positive and the SOC of the energy storage is less than $SOC_{min}$, the energy storage device initiates a recovery strategy; otherwise, exit the wind-storage primary frequency regulation.

By adopting the strategy of determining the frequency regulation strategy as wind turbine participation in primary frequency regulation when the current frequency regulation power is greater than or equal to the system frequency regulation demand power, and determining the frequency regulation strategy as wind-storage joint frequency regulation when the current frequency regulation power is less than the system frequency regulation demand power. Considering the actual wind speed and the rotational speed of the doubly-fed wind turbine, ensure its operation within the normal speed range, and adjust its virtual inertia control coefficient based on the wind turbine's rotational speed to enable the wind turbine to provide as much active power as possible to participate in the system's primary frequency regulation under the current operating conditions. At the same time, combining the SOC state of the energy storage, adjust its droop control coefficient for participation in primary frequency regulation to ensure that the energy storage device can maintain long-term effective primary frequency regulation capability.

Based on Embodiment 1, Embodiment 5 of this application proposes a variable coefficient wind-storage joint primary frequency regulation coordination control method considering rotational speed and SOC. After Step S110, it includes:

Step S510: If the frequency deviation has not exceeded the frequency regulation deadband, determine whether to initiate the energy storage recovery strategy based on the collected energy storage device status.

Step S520: If initiated, determine the charging recovery coefficient and discharging recovery coefficient based on the energy storage device status and the preset energy storage minimum value, energy storage median value, and energy storage maximum value.

Step S530: Execute the energy storage recovery strategy based on the charging recovery coefficient and discharging recovery coefficient.

As an optional implementation, in cases where the frequency deviation has not exceeded the frequency regulation deadband, collect the status data of the energy storage device. The energy storage device status data can include information such as the current charging state, discharging state, and energy storage capacity. Based on the collected energy storage device status data, determine whether to initiate the energy storage recovery strategy. The determination can be made based on preset conditions, such as initiating the energy storage recovery strategy when the energy storage capacity is below the preset minimum value. If the energy storage recovery strategy is initiated, determine the charging recovery coefficient and discharging recovery coefficient based on the energy storage device status and the preset energy storage minimum value, median value, and maximum value. The charging recovery coefficient and discharging recovery coefficient can be determined based on the current state and energy storage capacity of the energy storage device. For example, when the energy storage capacity is below the preset minimum value, a larger charging recovery coefficient can be set to increase the charging speed; when the energy storage capacity is above the preset median value, a smaller discharging recovery coefficient can be set to reduce the discharging speed. Based on the determined charging recovery coefficient and discharging recovery coefficient, execute the energy storage recovery strategy. Adjust the charging and discharging rates to control the charging and discharging process of the energy storage device according to its current state and recovery coefficients. For example, increase the charging rate according to the charging recovery coefficient, or decrease the discharging rate according to the discharging recovery coefficient, to restore the state of the energy storage device.

Figure 5:
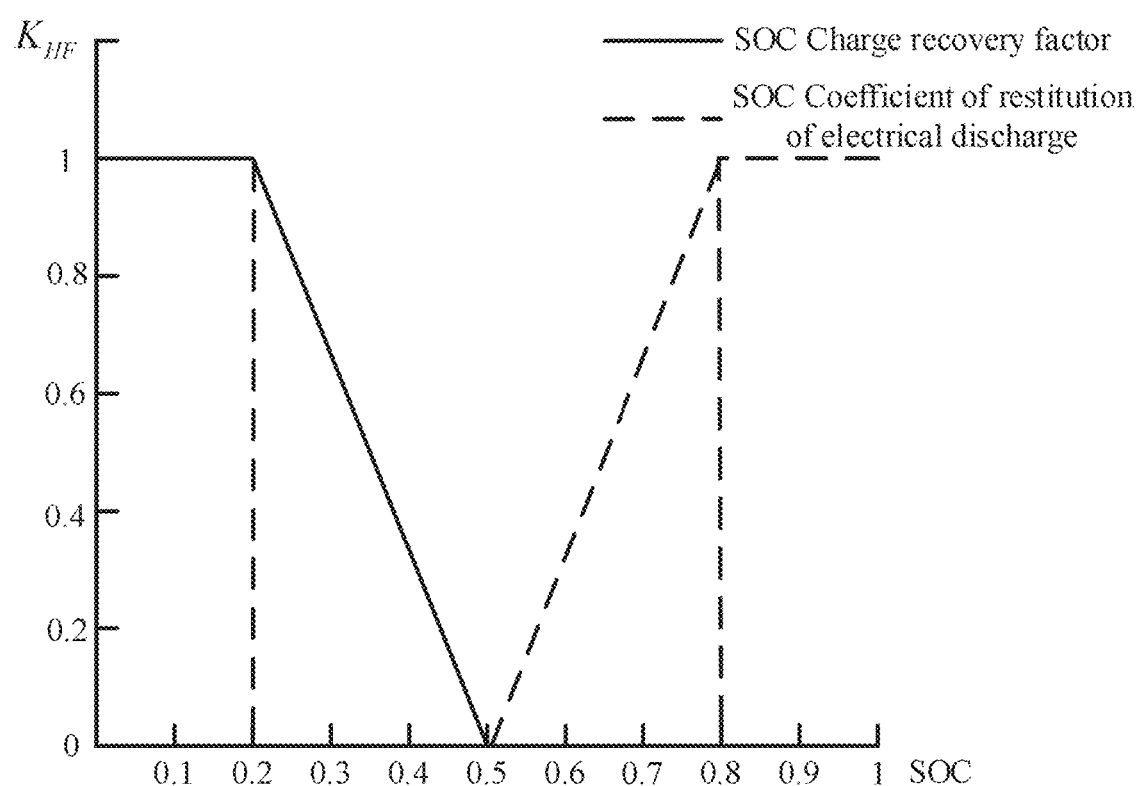
FIG. 5 is a schematic diagram of the energy storage charge-discharge recovery coefficient curve in Example 5 of the variable coefficient wind-storage joint primary frequency regulation coordination control method considering rotational speed and SOC in this application.

Exemplarily, if $|\Delta f|=|f-f_N|>0.33$ and $\Delta f>0$, the energy storage initiates a self-recovery strategy. Refer to FIG. 5, as follows:

The battery charging recovery coefficient $K_{HF}$ is:

$$K_{HF} = K_{hf} \begin{cases} 1 & , 0 \le SOD_t \le SOC_{min} \\ \dfrac{SOC_{min} - SOC_t}{SOC_{min} - SOC_{min}} & , SOC_{min} < SOC_t < SOC_{mid} \\ 0 & , SOC_{mid} \le SOC_t \le 1 \end{cases}$$

The battery discharging recovery coefficient is:

$$K_{HF} = K_{hf} \begin{cases} 1 & , 0 \le SOD_t \le SOC_{mid} \\ \dfrac{SOC_{min} - SOC_t}{SOC_{min} - SOC_{min}} & , SOC_{mid} < SOC_t < SOC_{min} \\ 0 & , SOC_{max} \le SOC_t \le 1 \end{cases}$$

Figure 8:
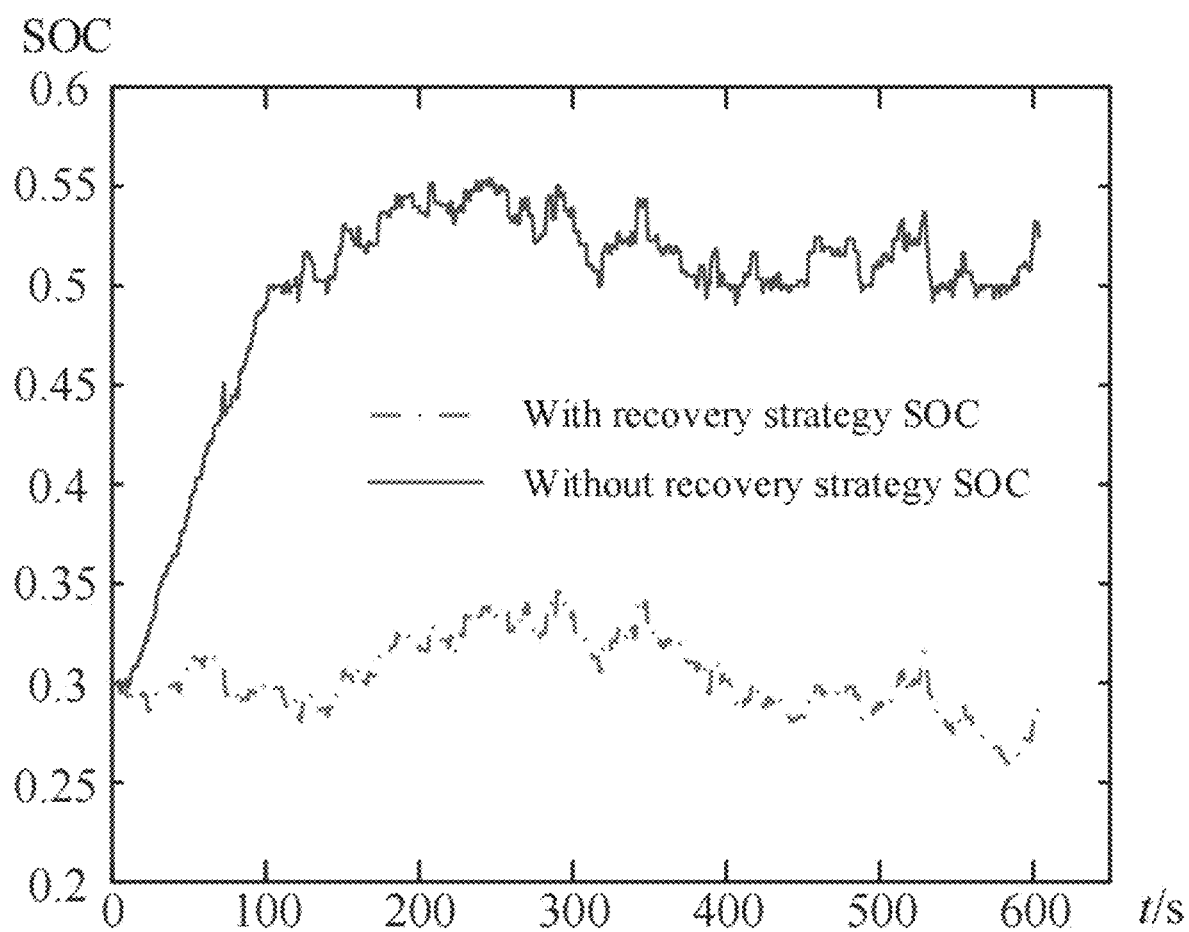
FIG. 8 is a self-recovery curve diagram of energy storage SOC in Example 5 of the variable coefficient wind-storage joint primary frequency regulation coordination control method considering rotational speed and SOC in this application.

In the formula, $SOC_{min}$ is the minimum SOC value of the energy storage, set to 0.2, $SOC_{mid}$ is the expected SOC value of the energy storage, set to 0.5, and $SOC_{max}$ is the maximum SOC value of the energy storage, set to 0.8. Refer to FIG. 8, where FIG. 8 is the self-recovery curve of the energy storage SOC.

Since the frequency deviation does not exceed the frequency regulation dead zone, the energy storage recovery strategy is determined based on the collected state of the energy storage device. If enabled, the charging recovery coefficient and discharging recovery coefficient are determined separately based on the state of the energy storage device and the preset minimum, medium, and maximum energy storage values. The energy storage recovery strategy is then executed based on the charging and discharging recovery coefficients. This ensures that the frequency regulation capacity margin of the battery pack is maximized during charging and discharging by considering the SOC reduction caused by self-discharge. At the same time, the shallow charging and discharging approach enhances the service life of the energy storage device.

Figure 9:
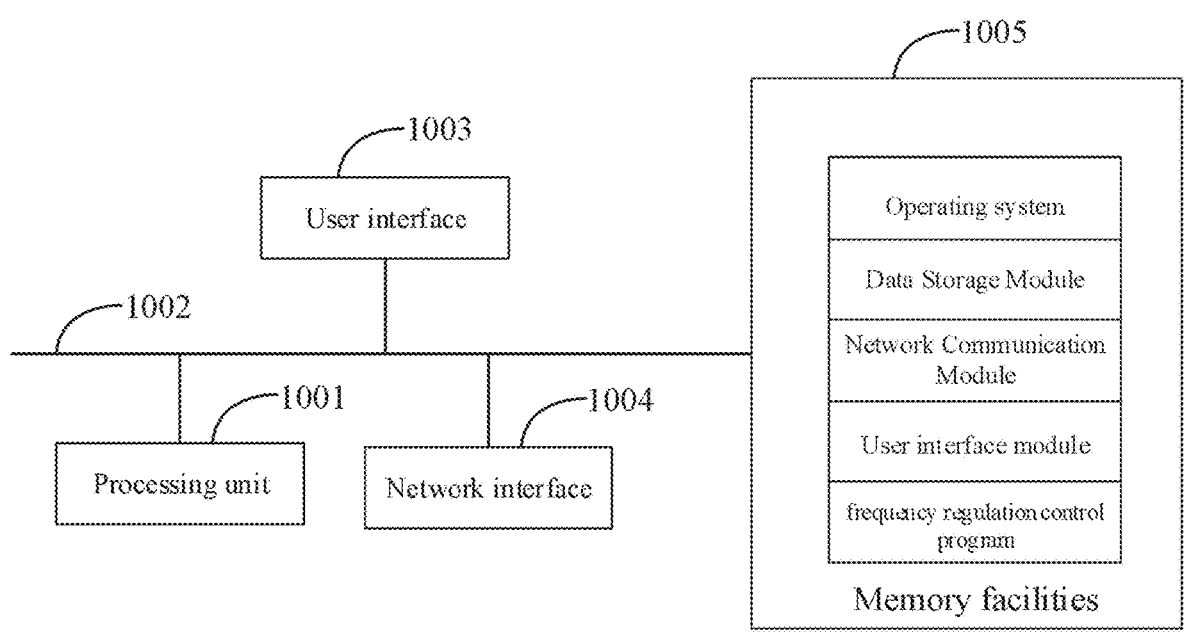
FIG. 9 is a schematic diagram of the hardware structure involved in the equipment of the variable coefficient wind-storage joint primary frequency regulation coordination control method considering rotational speed and SOC in Example 5 of this application.

This application also proposes a variable coefficient wind-storage joint primary frequency regulation coordination control device considering rotational speed and SOC. Refer to FIG. 9, which shows a schematic diagram of the hardware operating environment for the variable coefficient wind-storage joint primary frequency regulation coordination control device considering rotational speed and SOC as described in the embodiment of this application.

As shown in FIG. 9, the variable coefficient wind-storage joint primary frequency regulation coordination control device considering rotational speed and SOC can include: a processor 1001, such as a Central Processing Unit (CPU), a communication bus 1002, a user interface 1003, a network interface 1004, and a memory 1005. The communication bus 1002 is used to enable connection and communication between these components. The user interface 1003 may include a display screen and input units such as a keyboard. Optionally, the user interface 1003 may also include standard wired or wireless interfaces. The network interface 1004 may optionally include standard wired or wireless interfaces (e.g., Wireless Fidelity (Wi-Fi) interfaces). The memory 1005 can be high-speed Random Access Memory (RAM) or stable non-volatile memory (NVM), such as disk storage. Optionally, the memory 1005 may also be a storage device independent of the aforementioned processor 1001.

Those skilled in the art will understand that the structure shown in FIG. 9 does not limit the variable coefficient wind-storage joint primary frequency regulation coordination control device considering rotational speed and SOC. It may include more or fewer components than illustrated, or combine certain components, or have different arrangements of components.

Optionally, the memory 1005 is electrically connected to the processor 1001. The processor 1001 can be used to control the operation of the memory 1005 and can also read data from the memory 1005 to implement the variable coefficient wind-storage joint primary frequency regulation coordination control considering rotational speed and SOC.

Optionally, as shown in FIG. 9, the memory 1005, serving as a storage medium, may include an operating system, a data storage module, a network communication module, a user interface module, and a frequency regulation control program.

Optionally, in the variable coefficient wind-storage joint primary frequency regulation coordination control device considering rotational speed and SOC shown in FIG. 9, the network interface 1004 is primarily used for data communication with other devices, and the user interface 1003 is primarily used for data interaction with users. The processor 1001 and memory 1005 in the variable coefficient wind-storage joint primary frequency regulation coordination control device considering rotational speed and SOC may be set within the device itself.

As shown in FIG. 9, the variable coefficient wind-storage joint primary frequency regulation coordination control device considering rotational speed and SOC invokes the frequency regulation control program stored in the memory 1005 through the processor 1001 and executes the relevant steps and operations provided by the method of variable coefficient wind-storage joint primary frequency regulation coordination control considering rotational speed and SOC in this application.

Determine whether the frequency deviation exceeds the primary frequency regulation dead zone based on the obtained grid frequency;

If it exceeds, determine the system frequency regulation demand power based on the frequency deviation;

Determine the current frequency regulation power based on the obtained rotational speed of the wind turbine, where the current frequency regulation power is the frequency regulation power that can be provided by the wind turbine;

Determine the frequency regulation strategy based on the system frequency regulation demand power and the current frequency regulation power;

Execute the frequency regulation strategy.

Optionally, the processor 1001 can invoke the frequency regulation control program stored in the memory 1005 and also execute the following operations:

Obtain the system rated frequency and the preset primary frequency regulation dead zone;

Determine the frequency deviation based on the grid frequency and the system rated frequency;

When the frequency deviation is within the interval corresponding to the primary frequency regulation dead zone, determine that the frequency deviation has not exceeded the primary frequency regulation dead zone;

Otherwise, determine that the frequency deviation has exceeded the primary frequency regulation dead zone.

Optionally, the processor 1001 can invoke the frequency regulation control program stored in the memory 1005 and also execute the following operations:

Determine the first power based on the frequency deviation and the first coefficient;

Determine the second power based on the frequency deviation and the second coefficient;

Determine the system frequency regulation demand power based on the difference between the first power and the second power.

Optionally, the processor 1001 can invoke the frequency regulation control program stored in the memory 1005 and also execute the following operation:

Determine the historical rotational speed of the wind turbine.

Determine the virtual inertia time constant of the wind turbine;

Determine the current frequency regulation power based on the historical rotational speed, the wind turbine rotational speed, and the virtual inertia time constant.

Optionally, the processor 1001 can invoke the frequency regulation control program stored in the memory 1005 and also execute the following operations:

When the current frequency regulation power is greater than or equal to the system frequency regulation demand power, determine that the frequency regulation strategy is for the wind turbine to participate in primary frequency regulation;

When the current frequency regulation power is less than the system frequency regulation demand power, determine that the frequency regulation strategy is for wind-storage joint frequency regulation.

Optionally, the processor 1001 can invoke the frequency regulation control program stored in the memory 1005 and also execute the following operations:

When the current frequency regulation power is greater than or equal to the system frequency regulation demand power, combine the system frequency regulation demand power and the actual frequency regulation power of the wind turbine;

Determine the inertia coefficient based on the combined relationship and the virtual inertia time constant;

Determine the variable coefficient virtual inertia control strategy based on the inertia coefficient.

Optionally, the processor 1001 can invoke the frequency regulation control program stored in the memory 1005 and also execute the following operations:

When the current frequency regulation power is less than the system frequency regulation demand power, determine the droop coefficient of the energy storage device based on the frequency deviation and the collected state of the energy storage device.

Determine the frequency regulation strategy as wind-storage joint frequency regulation based on the current frequency regulation power and the droop coefficient.

Optionally, the processor 1001 can invoke the frequency regulation control program stored in the memory 1005 and also execute the following operations:

If the frequency deviation does not exceed the frequency regulation dead zone, determine whether to activate the energy storage recovery strategy based on the collected state of the energy storage device;

If activated, determine the charging recovery coefficient and discharging recovery coefficient respectively based on the state of the energy storage device and the preset energy storage minimum value, medium value, and maximum value;

Execute the energy storage recovery strategy based on the charging recovery coefficient and the discharging recovery coefficient.

Those skilled in the art should understand that the embodiments of this application can be provided as a method, system, or computer program product. Therefore, this application can take the form of a fully hardware implementation, a fully software implementation, or a combination of software and hardware implementation. Moreover, this application can take the form of a computer program product implemented on one or more computer-readable storage media (including but not limited to disk storage, CD-ROM, optical storage, etc.) containing computer-usable program code.

This application is described with reference to flowcharts and/or block diagrams of methods, devices (systems), and computer program products according to the embodiments of this application. It should be understood that each flow and/or block in the flowcharts and/or block diagrams, as well as combinations of flows and/or blocks in the flowcharts and/or block diagrams, can be implemented by computer program instructions. These computer program instructions can be provided to a processor of a general-purpose computer, special-purpose computer, embedded processor, or other programmable data processing equipment to produce a machine, such that the instructions executed by the processor of the computer or other programmable data processing equipment create means for implementing the functions specified in one or more flows of the flowchart and/or one or more blocks of the block diagram.

These computer program instructions can also be stored in a computer-readable memory that can direct a computer or other programmable data processing equipment to function in a particular manner, such that the instructions stored in the computer-readable memory produce an article of manufacture including instruction means that implement the functions specified in one or more flows of the flowchart and/or one or more blocks of the block diagram.

These computer program instructions can also be loaded onto a computer or other programmable data processing equipment, causing a series of operational steps to be executed on the computer or other programmable equipment to produce a computer-implemented process, such that the instructions executed on the computer or other programmable equipment provide steps for implementing the functions specified in one or more flows of the flowchart and/or one or more blocks of the block diagram.

It should be noted that any reference signs in claims should not be construed as limiting the claims. The word "comprises" does not exclude the presence of elements or steps not listed in the claims. The word "a" or "an" before an element does not exclude the presence of multiple such elements. This application can be implemented by means of hardware including several distinct components or by means of a suitably programmed computer. In a unit claim for listing several devices, several of these devices may be embodied by the same hardware item. The words first, second, third, etc., do not indicate any order. These words should be understood as names.

Although the preferred embodiments of this application have been described, once those skilled in the art are aware of the basic inventive concept, they can make further changes and modifications to these embodiments. Therefore, the appended claims are intended to be interpreted as including the preferred embodiments and all changes and modifications falling within the scope of this application.

It is apparent that those skilled in the art can make various modifications and variations to this application without departing from the spirit and scope of this application. In this way, if such modifications and variations of this application fall within the scope of the claims of this application and their equivalent technologies, this application is also intended to include these modifications and variations.

What is claimed is:

1. A variable coefficient wind-storage joint primary frequency regulation coordination control method considering rotational speed and state of charge (SOC), comprising:
    determining, based on an acquired grid frequency, whether a frequency deviation exceeds a primary frequency regulation dead zone;
    when the frequency deviation exceeds the primary frequency regulation dead zone, determining a system frequency regulation demand power based on the frequency deviation;
    determining a current frequency regulation power based on an acquired rotational speed of wind turbines, wherein the current frequency regulation power is provided by the wind turbines;
    determining a frequency regulation strategy based on the system frequency regulation demand power and the current frequency regulation power; and
    executing the frequency regulation strategy;
    wherein the step of determining the system frequency regulation demand power based on the frequency deviation comprises:
        determining a first power based on the frequency deviation and a first coefficient;
        determining a second power based on the frequency deviation and a second coefficient; and
        determining the system frequency regulation demand power based on a difference between the first power and the second power;
    wherein the step of determining the current frequency regulation power based on the acquired rotational speed of the wind turbines comprises:
        determining a historical rotational speed of the wind turbines;
        determining a virtual inertia time constant of the wind turbines; and
        determining the current frequency regulation power based on the historical rotational speed, the rotational speed of the wind turbines, and the virtual inertia time constant.

2. The variable coefficient wind-storage joint primary frequency regulation coordination control method according to claim 1, wherein the step of determining, based on the acquired grid frequency, whether the frequency deviation exceeds the primary frequency regulation dead zone comprises:
    obtaining a system-rated frequency and the primary frequency regulation dead zone, wherein the primary frequency regulation dead zone is preset;
    determining the frequency deviation based on the acquired grid frequency and the system-rated frequency; and
    determining that the frequency deviation does not exceed the primary frequency regulation dead zone when the frequency deviation is within a range corresponding to the primary frequency regulation dead zone; otherwise, determining that the frequency deviation exceeds the primary frequency regulation dead zone.

3. The variable coefficient wind-storage joint primary frequency regulation coordination control method according to claim 1, wherein the step of determining the frequency regulation strategy based on the system frequency regulation demand power and the current frequency regulation power comprises:
    determining that the frequency regulation strategy is turbine participation in primary frequency regulation when the current frequency regulation power is greater than or equal to the system frequency regulation demand power; and
    determining that the frequency regulation strategy is joint wind-storage participation in the primary frequency regulation when the current frequency regulation power is less than the system frequency regulation demand power.

4. The variable coefficient wind-storage joint primary frequency regulation coordination control method according to claim 3, wherein the step of determining that the frequency regulation strategy is the turbine participation in the primary frequency regulation when the current frequency regulation power is greater than or equal to the system frequency regulation demand power comprises:
    determining the system frequency regulation demand power and an actual frequency regulation power of the wind turbines simultaneously when the current frequency regulation power is greater than or equal to the system frequency regulation demand power;
    determining an inertia coefficient based on simultaneous equations and the virtual inertia time constant; and
    determining a variable coefficient virtual inertia control strategy based on the inertia coefficient.

5. The variable coefficient wind-storage joint primary frequency regulation coordination control method according to claim 3, wherein the step of determining that the frequency regulation strategy is the joint wind-storage participation in the primary frequency regulation when the current frequency regulation power is less than the system frequency regulation demand power comprises:
    determining a droop coefficient of an energy storage device based on the frequency deviation and a collected state of the energy storage device when the current frequency regulation power is less than the system frequency regulation demand power; and
    determining the frequency regulation strategy as the joint wind-storage participation in the primary frequency regulation based on the current frequency regulation power and the droop coefficient.

6. The variable coefficient wind-storage joint primary frequency regulation coordination control method according to claim 1, wherein after the step of determining, based on the acquired grid frequency, whether the frequency deviation exceeds the primary frequency regulation dead zone, the variable coefficient wind-storage joint primary frequency regulation coordination control method further comprises:
    when the frequency deviation does not exceed the primary frequency regulation dead zone, determining whether to initiate an energy storage recovery strategy based on a collected state of an energy storage device;
    when the energy storage recovery strategy is initiated, determining a charging recovery coefficient and a discharging recovery coefficient based on the collected state of the energy storage device and preset minimum, median, and maximum energy storage values; and executing the energy storage recovery strategy based on the charging recovery coefficient and the discharging recovery coefficient.

7. A variable coefficient wind-storage joint primary frequency regulation coordination control device considering rotational speed and SOC, comprising:
   a memory;
   a processor; and
   a frequency regulation control program stored in the memory and executable on the processor, wherein the processor executes the frequency regulation control program to perform steps of the variable coefficient wind-storage joint primary frequency regulation coordination control method according to claim 1.

8. A computer-readable storage medium, wherein a frequency regulation control program is stored on the computer-readable storage medium, and the frequency regulation control program, when executed by a processor, performs steps of the variable coefficient wind-storage joint primary frequency regulation coordination control method according to claim 1.

9. The variable coefficient wind-storage joint primary frequency regulation coordination control device according to claim 7, wherein in the variable coefficient wind-storage joint primary frequency regulation coordination control method, the step of determining, based on the acquired grid frequency, whether the frequency deviation exceeds the primary frequency regulation dead zone comprises:
   obtaining a system-rated frequency and the primary frequency regulation dead zone, wherein the primary frequency regulation dead zone is preset;
   determining the frequency deviation based on the acquired grid frequency and the system-rated frequency; and
   determining that the frequency deviation does not exceed the primary frequency regulation dead zone when the frequency deviation is within a range corresponding to the primary frequency regulation dead zone; otherwise, determining that the frequency deviation exceeds the primary frequency regulation dead zone.

10. The variable coefficient wind-storage joint primary frequency regulation coordination control device according to claim 7, wherein in the variable coefficient wind-storage joint primary frequency regulation coordination control method, the step of determining the frequency regulation strategy based on the system frequency regulation demand power and the current frequency regulation power comprises:
    determining that the frequency regulation strategy is turbine participation in primary frequency regulation when the current frequency regulation power is greater than or equal to the system frequency regulation demand power; and
    determining that the frequency regulation strategy is joint wind-storage participation in the primary frequency regulation when the current frequency regulation power is less than the system frequency regulation demand power.

11. The variable coefficient wind-storage joint primary frequency regulation coordination control device according to claim 10, wherein the step of determining that the frequency regulation strategy is the turbine participation in the primary frequency regulation when the current frequency regulation power is greater than or equal to the system frequency regulation demand power comprises:
    determining the system frequency regulation demand power and an actual frequency regulation power of the wind turbines simultaneously when the current frequency regulation power is greater than or equal to the system frequency regulation demand power;
    determining an inertia coefficient based on simultaneous equations and the virtual inertia time constant; and
    determining a variable coefficient virtual inertia control strategy based on the inertia coefficient.

12. The variable coefficient wind-storage joint primary frequency regulation coordination control device according to claim 10, wherein the step of determining that the frequency regulation strategy is the joint wind-storage participation in the primary frequency regulation when the current frequency regulation power is less than the system frequency regulation demand power comprises:
    determining a droop coefficient of an energy storage device based on the frequency deviation and a collected state of the energy storage device when the current frequency regulation power is less than the system frequency regulation demand power; and
    determining the frequency regulation strategy as the joint wind-storage participation in the primary frequency regulation based on the current frequency regulation power and the droop coefficient.

13. The variable coefficient wind-storage joint primary frequency regulation coordination control device according to claim 7, wherein after the step of determining, based on the acquired grid frequency, whether the frequency deviation exceeds the primary frequency regulation dead zone, the variable coefficient wind-storage joint primary frequency regulation coordination control method further comprises:
    when the frequency deviation does not exceed the primary frequency regulation dead zone, determining whether to initiate an energy storage recovery strategy based on a collected state of an energy storage device;
    when the energy storage recovery strategy is initiated, determining a charging recovery coefficient and a discharging recovery coefficient based on the collected state of the energy storage device and preset minimum, median, and maximum energy storage values; and
    executing the energy storage recovery strategy based on the charging recovery coefficient and the discharging recovery coefficient.

14. The computer-readable storage medium according to claim 8, wherein in the variable coefficient wind-storage joint primary frequency regulation coordination control method, the step of determining, based on the acquired grid frequency, whether the frequency deviation exceeds the primary frequency regulation dead zone comprises:
    obtaining a system-rated frequency and the primary frequency regulation dead zone, wherein the primary frequency regulation dead zone is preset;
    determining the frequency deviation based on the acquired grid frequency and the system-rated frequency; and
    determining that the frequency deviation does not exceed the primary frequency regulation dead zone when the frequency deviation is within a range corresponding to the primary frequency regulation dead zone; otherwise, determining that the frequency deviation exceeds the primary frequency regulation dead zone.

15. The computer-readable storage medium according to claim 8, wherein in the variable coefficient wind-storage joint primary frequency regulation coordination control method, the step of determining the frequency regulation strategy based on the system frequency regulation demand power and the current frequency regulation power comprises:

determining that the frequency regulation strategy is turbine participation in primary frequency regulation when the current frequency regulation power is greater than or equal to the system frequency regulation demand power; and determining that the frequency regulation strategy is joint wind-storage participation in the primary frequency regulation when the current frequency regulation power is less than the system frequency regulation demand power.

16. The computer-readable storage medium according to claim 15, wherein the step of determining that the frequency regulation strategy is the turbine participation in the primary frequency regulation when the current frequency regulation power is greater than or equal to the system frequency regulation demand power comprises:

determining the system frequency regulation demand power and an actual frequency regulation power of the wind turbines simultaneously when the current frequency regulation power is greater than or equal to the system frequency regulation demand power;

determining an inertia coefficient based on simultaneous equations and the virtual inertia time constant; and determining a variable coefficient virtual inertia control strategy based on the inertia coefficient.

17. The computer-readable storage medium according to claim 15, wherein the step of determining that the frequency regulation strategy is the joint wind-storage participation in the primary frequency regulation when the current frequency regulation power is less than the system frequency regulation demand power comprises:

determining a droop coefficient of an energy storage device based on the frequency deviation and a collected state of the energy storage device when the current frequency regulation power is less than the system frequency regulation demand power; and determining the frequency regulation strategy as the joint wind-storage participation in the primary frequency regulation based on the current frequency regulation power and the droop coefficient.

18. The computer-readable storage medium according to claim 8, wherein after the step of determining, based on the acquired grid frequency, whether the frequency deviation exceeds the primary frequency regulation dead zone, the variable coefficient wind-storage joint primary frequency regulation coordination control method further comprises:

when the frequency deviation does not exceed the primary frequency regulation dead zone, determining whether to initiate an energy storage recovery strategy based on a collected state of an energy storage device;

when the energy storage recovery strategy is initiated, determining a charging recovery coefficient and a discharging recovery coefficient based on the collected state of the energy storage device and preset minimum, median, and maximum energy storage values; and executing the energy storage recovery strategy based on the charging recovery coefficient and the discharging recovery coefficient.

* * * * *